United States Patent
Sixta et al.

(10) Patent No.: US 11,549,200 B2
(45) Date of Patent: Jan. 10, 2023

(54) PROCESS FOR MAKING CELLULOSE FIBRE OR FILM

(71) Applicants: Aalto University Foundation sr, Aalto (FI); Helsingin yliopisto, Helsingin yliopisto (FI)

(72) Inventors: Herbert Sixta, Aalto (FI); Michael Hummel, Aalto (FI); Kadvaël Le Boulch, Aalto (FI); Ilkka Kilpeläinen, Helsingin yliopisto (FI); Alistair W.T. King, Helsingin yliopisto (FI); Jussi Helminen, Helsingin yliopisto (FI); Sanna Hellsten, Aalto (FI)

(73) Assignees: Aalto University Foundation sr, Aalto (FI); Helsingin Yliopisto, Helsingin yliopisto (FI)

(*) Notice: Subject to any disclaimer, the term of this patent is extended or adjusted under 35 U.S.C. 154(b) by 698 days.

(21) Appl. No.: 16/481,071

(22) PCT Filed: Jan. 30, 2018

(86) PCT No.: PCT/FI2018/050070
§ 371 (c)(1),
(2) Date: Jul. 26, 2019

(87) PCT Pub. No.: WO2018/138416
PCT Pub. Date: Aug. 2, 2018

(65) Prior Publication Data
US 2020/0002848 A1    Jan. 2, 2020

(30) Foreign Application Priority Data
Jan. 30, 2017 (FI) .................................. 20175078

(51) Int. Cl.
*D01F 2/00* (2006.01)
*B29C 48/00* (2019.01)
(Continued)

(52) U.S. Cl.
CPC .............. *D01F 2/00* (2013.01); *B29C 48/022* (2019.02); *C08J 5/18* (2013.01); *D01F 13/02* (2013.01);
(Continued)

(58) Field of Classification Search
CPC ......... D01F 2/00; D01F 13/02; B29C 48/022; C08J 5/18; C08J 2301/02; B29K 2001/00; B29L 2007/008
(Continued)

(56) References Cited

U.S. PATENT DOCUMENTS

| 4,246,221 A | 1/1981 | McCorsley, III |
| 2008/0269477 A1 | 10/2008 | Stegmann et al. |

FOREIGN PATENT DOCUMENTS

| CN | 101275293 A | 10/2008 |
| CN | 101346416 A | 1/2009 |

(Continued)

OTHER PUBLICATIONS

Buijtenhuijs et al: The degradation and stabilization of cellulose dissolved in N-methylmorpholine N-oxide (NMMO). Papier, 1986, vol. 40, pp. 615-619.
(Continued)

*Primary Examiner* — Jeffrey M Wollschlager
*Assistant Examiner* — Xue H Liu
(74) *Attorney, Agent, or Firm* — Laine IP Oy

(57) ABSTRACT

According to an example aspect of the present invention, there is provided A process for making a cellulose fibre or film comprising the steps of dissolving pulp in an ionic liquid containing a cationic 1,5,7-triazabicyclo[4.4.0]dec-5-enium [TBDH]+ moiety and an anion selected from the group according to Formula a), Formula b) and Formula c), wherein each of R, $R^2$, $R^3$, $R^4$, $R^5$, $R^7$, $R^8$, $R^9$ and $R^{10}$ is H or an organyl radical and $X^-$ is selected from the group
(Continued)

consisting of halides, pseudohalides, carboxylates, alkyl sulphite, alkyl sulphate, dialkylphosphite, dialkyl phosphate, dialkyl phosphonites and dialkyl phosphonates, to provide a spinning dope, extruding the spinning dope through a spinneret to form one or more filaments, and a step selected from the group consisting of spinning cellulose fibres from the solution, and extruding a cellulose film from the solution.

18 Claims, 12 Drawing Sheets

(51) Int. Cl.
  *C08J 5/18* (2006.01)
  *D01F 13/02* (2006.01)
  *B29K 1/00* (2006.01)
  *B29L 7/00* (2006.01)

(52) U.S. Cl.
  CPC ..... *B29K 2001/00* (2013.01); *B29L 2007/008* (2013.01); *C08J 2301/02* (2013.01); *D10B 2501/00* (2013.01)

(58) Field of Classification Search
  USPC ........................................................ 264/37.26
  See application file for complete search history.

(56) References Cited

FOREIGN PATENT DOCUMENTS

| | | |
|---|---|---|
| CN | 103848994 A | 6/2014 |
| CN | 105392929 A | 3/2016 |
| DE | 102004031025 B3 | 12/2005 |
| DE | 102005017715 A1 | 10/2006 |
| EP | 0490870 A2 | 6/1992 |
| WO | WO 03029329 A2 | 4/2003 |
| WO | WO 2006108861 A2 | 10/2006 |
| WO | WO 2007101812 A1 | 9/2007 |
| WO | WO 2007128268 A2 | 11/2007 |
| WO | WO 2009118262 A1 | 10/2009 |

OTHER PUBLICATIONS

Bywater: The global viscose fibre industry in the 21st century—the first 10 years Lenzinger Ber., 2011, vol. 89, pp. 22-29.
CAC, CIRFS, Fibre Economic Bureau, National Statistics, The Fibre Year 2015.
Hummel et al: Ionic Liquids for the Production of Man-Made Cellulosic Fibres: Opportunities and Challenges. Adv. Poly. Sci., 2016, vol. 271, pp. 133-168.
Nowicki et al: Ionic liquids derived from organosuperbased: en route to superionic liquids. RSC Advances, Jan. 1, 2016. Vol. 6, No. 11, pp. 9194-9208.
Parviainen et al: Predicting cellulose solvating capabilities of acid-base conjugate ionic liquids. CHEMSUSCHEM, Sep. 18, 2013. Vol. 6, No. 11, pp. 2161-2169.
Rosenau et al: The chemistry of side reactions and byproduct formation in the system NMMO/cellulose (Lyocell process). Progress in Polymer Science, 2001, vol. 26(9), pp. 1763-1837.
Röder et al: Comparative cha-racterisation of man-made regenerated cellulose fibres. Lenzinger Ber. 2009, vol. 87, pp. 98-105.
Swatloski et al: Dissolution of Cellose with Ionic Liquids. J. Am. Chem. Soc. 2002, vol. 124, pp. 4974-4975.
Pang et al: Liaoning Science and Technology Press. Novel Regenerated Cellulose Fiber 1st Edition, Mar. 31, 2009, pp. 13-15.
He et al: Novel fiber materials science, Donghua Univ Press Co 1st edition, Jul. 31, 2014. pp. 146.

[DBNH][OAc]

[APPH][OAc]

PROCESS FOR MAKING CELLULOSE FIBRE OR FILM

FIELD

The present invention relates to a process for making a cellulose fibre or film. Further, the invention relates to the use of ionic liquids with enhanced hydrothermal stability for dissolving pulp as well as a cellulose solution in an ionic liquid with enhanced hydrothermal stability, suitable for use in spinning cellulose fibres.

BACKGROUND

The textile market comprises conventional clothing (apparel) textiles as well as the more and more important technical textiles (TT), which are used principally for their performance or functional characteristics rather than for their aesthetics, or are used for non-consumer (i.e. industrial) applications. The clothing textile market is predominantly (80%) based on either cotton or polyester, both having questionable effects on environment. Production of cotton requires a lot of water, artificial fertilizers and pesticides. Despite of the unsustainable cultivation of cotton the product properties are appreciated by consumers as they have good hand feel ("close-to-skin-feel-good") and are a natural fibre and, thus, biodegradable. The consumption of technical textiles is growing four times faster than clothing in both terms of value and volume. The market value for technical textiles reached a global turnover of 100 billion € in 2011 and is increasing rapidly especially in Asia. The share of viscose or other wood-based cellulosic fibres is only 6% of the entire fibre market. Between 1995 and 2005, the world's consumption of TT has grown by 41%. Roughly one fourth of the raw material used in technical textiles is natural based fibres (cotton, wood pulp), representing 3.8 million tons in year 2005. The global market for nonwovens was 7.05 million tons corresponding to a market value of about 19.8 billion euros in 2010 with estimated increase to 10 million tons by the end of 2016. The average growth (2010-2015) for all nonwovens and sustainable nonwovens is 8.5% and 12.7%, respectively, but in certain sectors the growth can exceed 25% p.a. The growth is expected to be further accelerated by enhanced properties of sustainable materials. The main market segments in terms of volume for nonwovens are hygiene (31.8%), construction (18.5%), wipes (15.4%) and filtration (4.0%). The total world fibre market was 89.4 Mt in 2014 and is estimated to grow by about 10% by 2020. The MMCF share of this global market was 6.7%, i.e. 6 Mt, and is estimated to grow by 6% by 2020. Present MMCF production capacities are unable to satisfy the future demand and it is estimated that the cellulose gap will be 10-20 Mt/a already in 2030.

Currently, approximately three quarter of the global production of man-made cellulosic fibres are based on the Viscose process. From an environmental point of view, however, it is questionable whether the Viscose technique should be further promoted. The utilization of large amounts of $CS_2$ and caustic results in hazardous byproducts such as $SO_x$ and $H_2S$ gases which may cause severe stress for labour forces and the environment. Alternatively, the so-called Lyocell process can convert pulps by direct dissolution in NMMO monohydrate into value added products. The first patents on the manufacture of Lyocell fibres were filed by American Enka/Akzona Inc (U.S. Pat. No. 4,246,221), later by Courtauld and Lenzing AG (EP0490870). The wood-pulp is dissolved in a solution of hot N-methyl morpholine N-oxide monohydrate and in contrast to the Viscose process, the spinning dope is not extruded directly into the coagulation medium (wet spinning) but passes an air gap where it remains a liquid filament for a short period of time. By drawing the fibre before and in the coagulation zone, the characteristic high tensile strength of Lyocell fibres is gained which—unlike Viscose fibres—remains high even under wet conditions. However, the versatility of the Lyocell process is limited by certain intrinsic properties of NMMO resulting from its peculiar structure. The N—O moiety impedes the implementation of redox-active agents whereas the cyclic ether structure is prone to so-called thermal runaway reactions necessitating appropriate stabilizers. Ionic liquids (ILs) could offer a possibility to bypass these problems. WO 03/029329 A2 claims the dissolution and possibility of regeneration of cellulose in a variety of ionic liquids. DE 102005017715 A1 and WO 2006/108861 A2 describe the dissolution of cellulose in various ionic liquids and mixtures of ILs with amine bases, respectively. In WO 2007/101812 A1 the intentional homogeneous degradation of cellulose in ionic liquids is demonstrated. Details concerning the fibre spinning from ionic liquid solutions can be found in DE 102004031025 B3, WO 2007/128268 A2, and WO 2009/118262 A1. The solvents described in those patents are mainly imidazolium based halides and carboxylates. Halides are characterized by a pronounced corrosiveness towards metal processing equipment and require high processing temperatures which leads to pronounced degradation of the cellulose. Carboxylates, and in particular 1-ethyl-3-methylimidazolium acetate, show inferior viscoelastic properties for fibre spinning.

Previously, 1,5-diazabicyclo[4.3.0]non-5-ene (DBN)-based ILs have been described as superior solvents for cellulose processing (WO 2014/162062 A1). In particular [DBNH] carboxylates could dissolve cellulose at moderate temperatures in short times. This contributes substantially to the maintenance of the cellulose integrity and to energy and costs savings. Further, they show superior spinnability in a dry-jet wet Lyocell-type spinning process to yield fibres with excellent mechanical properties. The resulting fibres are similar or slightly superior to Lyocell fibres. Notably, ILs are inherently safer than NMMO. The latter is prone to spontaneous thermal runaway reactions. Stabilizers are needed which, however, can only minimize the risk of accidents but cannot guarantee a 100% safe operation. For future processes as safe technological foundation is obviously a decisive asset—if not a key-requirement.

A key unit operation in the Lyocell process is the solvent recycling from the spin and washing baths. This comprises the removal of the antisolvent, typically water, through various evaporation stages. This exerts thermal stress on the solvent-antisolvent mixture and can cause degradation or other side reactions. This results in highly undesirable solvent losses and requires a strategy to reverse the (degradation) reactions and restore the original solvent structure. Further, solute (cellulose) degradation might occur during the dissolution, filtration, de-aeration and spinning operations and respective degradation products accumulate in the coagulation bath. NMMO is known to induce a wide set of cellulose degradations reactions. Stabilizers can prevent them only to a limited extent. This deteriorates the cost competiveness through material loss and additional purification steps within the solvent recovery. Additional solvent-derived degradation products can exacerbate the removal of carbohydrates from the recovered solvent.

SUMMARY OF THE INVENTION

It is an aim of the present invention to overcome at least some of the disadvantages described above and provide a process of making a cellulose fibre or film in which pulp is dissolved in TBD based ionic liquids and spun into textile fibres in a dry jet wet spinning procedure. The solvents are characterized by their ability to dissolve the wood pulp fast and by their enhanced hydro-thermal stability, in particular during solvent recycling. The resulting solutions are solid or depict high viscosity at low temperature but are processable visco-elastic solutions at moderately elevated temperatures (≤100° C.).

The invention is defined by the features of the independent claims. Some specific embodiments are defined in the dependent claims.

According to a first aspect of the present invention, there is provided a process for making a cellulose fibre or film comprising the steps of dissolving pulp in an ionic liquid containing a cationic 1,5,7-triazabicyclo[4.4.0]dec-5-enium [TBDH]$^+$ moiety and an anion selected from the group according to Formula a), Formula b) and Formula c), a)

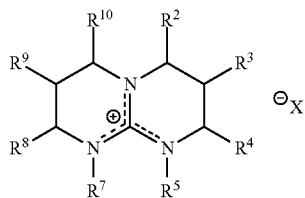

b)

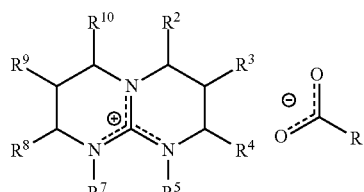

c)

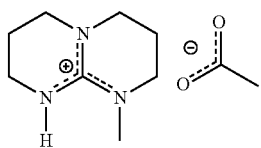

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates, to provide a spinning dope, and extruding the spinning dope through a spinneret to form one or more filaments.

According to a second aspect of the present invention, there is provided a use of an ionic liquid containing a cationic 1,5,7-triazabicyclo[4.4.0]dec-5-enium [TBDH]$^+$ moiety and an anion selected from the group according to Formula a), Formula b) and Formula c), a)

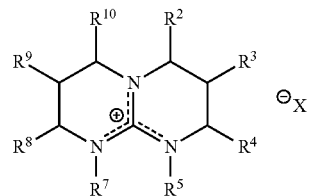

b)

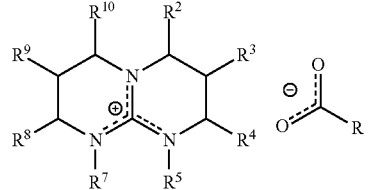

c)

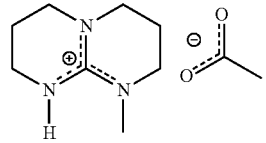

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates for dissolving pulp.

According to a third aspect of the invention there is provided a cellulose solution comprising cellulose derived from pulp and an ionic liquid with enhanced hydro-thermal stability, said ionic liquid comprising a cationic 1,5,7-triazabicyclo[4.4.0]dec-5-enium [TBDH]$^+$ moiety and an anion selected from the group according to Formula a), Formula b) and Formula c), a)

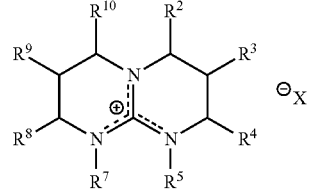

b)

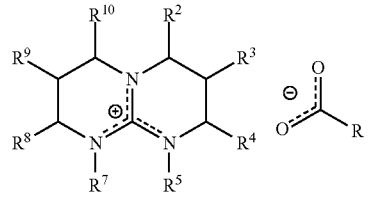

c)

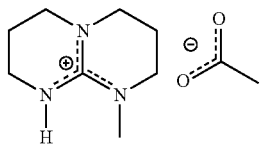

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates, said solution being suitable for use in spinning cellulose fibres.

According to a fourth aspect of the invention there is provided a use of a recycled ionic liquid containing a cationic 1,5,7-triazabicyclo[4.4.0]dec-5-enium [TBDH]⁺ moiety and an anion selected from the group according to Formula a), Formula b) and Formula c), a)

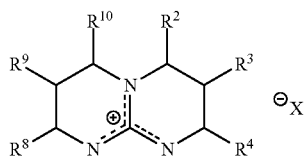

b)

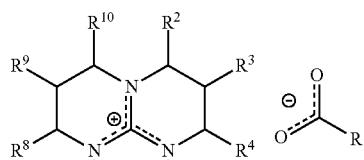

c)

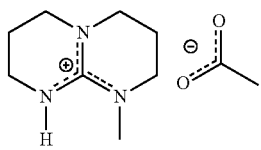

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates for the preparation of a cellulose fibre or film.

Considerable advantages are provided by the invention. By means of the invention it has surprisingly been found that a cellulose solution in an ionic liquid based on TBD has visco-elastic properties that are excellent for dry jet wet spinning where the filaments have to withstand high draw ratios. The good spinnability resulted in fibres with properties surpassing currently commercially available Lyocell fibres. This is in contrast to ionic liquids based on other guanidine derivatives.

BRIEF DESCRIPTION OF THE DRAWINGS

Next preferred embodiments will be examined more closely with the aid of a detailed description and with reference to the attached drawings.

EMBODIMENTS

As mentioned above, by means of embodiments it has surprisingly been found that in contrast to other guanidine derivatives, cellulose solutions in ionic liquids based on TBD surprisingly show visco-elastic properties that are excellent for dry jet wet spinning where the filaments have to withstand high draw ratios. The good spinnability resulted in fibres with properties surpassing currently commercially available Lyocell fibres. The particular favourable visco-elastic properties encountered for TBD-based IL-cellulose solutions allow for mild processing conditions during the unit operations of dissolution, filtration, de-aeration and spinning. This low thermal stress is reflected by an almost complete conservation of the cellulose's molar mass distribution.

Compared to [DBNH][OAc] in our previous invention on the IONCELL-F process (WO 2014/162062 A1), [mTBDH][OAc] shows considerably increased hydrolytic stability (Table 1). [DBNH][OAc] has been shown to be unstable under recycling conditions. If solutions of [DBNH][OAc]:H2O (1:1 mol eq) and [mTBDH][OAc]:H₂O (1:1 mol eq) are subjected to heat we find that ca. 5 mol % of [DBNH][OAc] are hydrolysed at 90° C. over 15 min, whereas [mTBDH][OAc] is only hydrolysed by <0.3% under the same conditions. 90° C. is roughly the conditions required for recycling the ionic liquid (water evaporation) and a 1:1 mol composition of ionic liquid and water are the conditions where hydrolysis becomes problematic. Even at 130° C.,

[mTBDH][OAc] only hydrolyses ~3% over 15 min, hence, its hydrolytic stability is drastically increased.

TABLE 1

Results of the preliminary hydrolysis kinetics studies.

|  | Extent of Hydrolysis | |
| --- | --- | --- |
|  | at 90° C. after 15 min | at 130° C. after 60 min |
| [DBNH][OAc] | 5.2% |  |
| [mTBDH][OAc] | <0.3% | 11.4% |

Figure 1A:
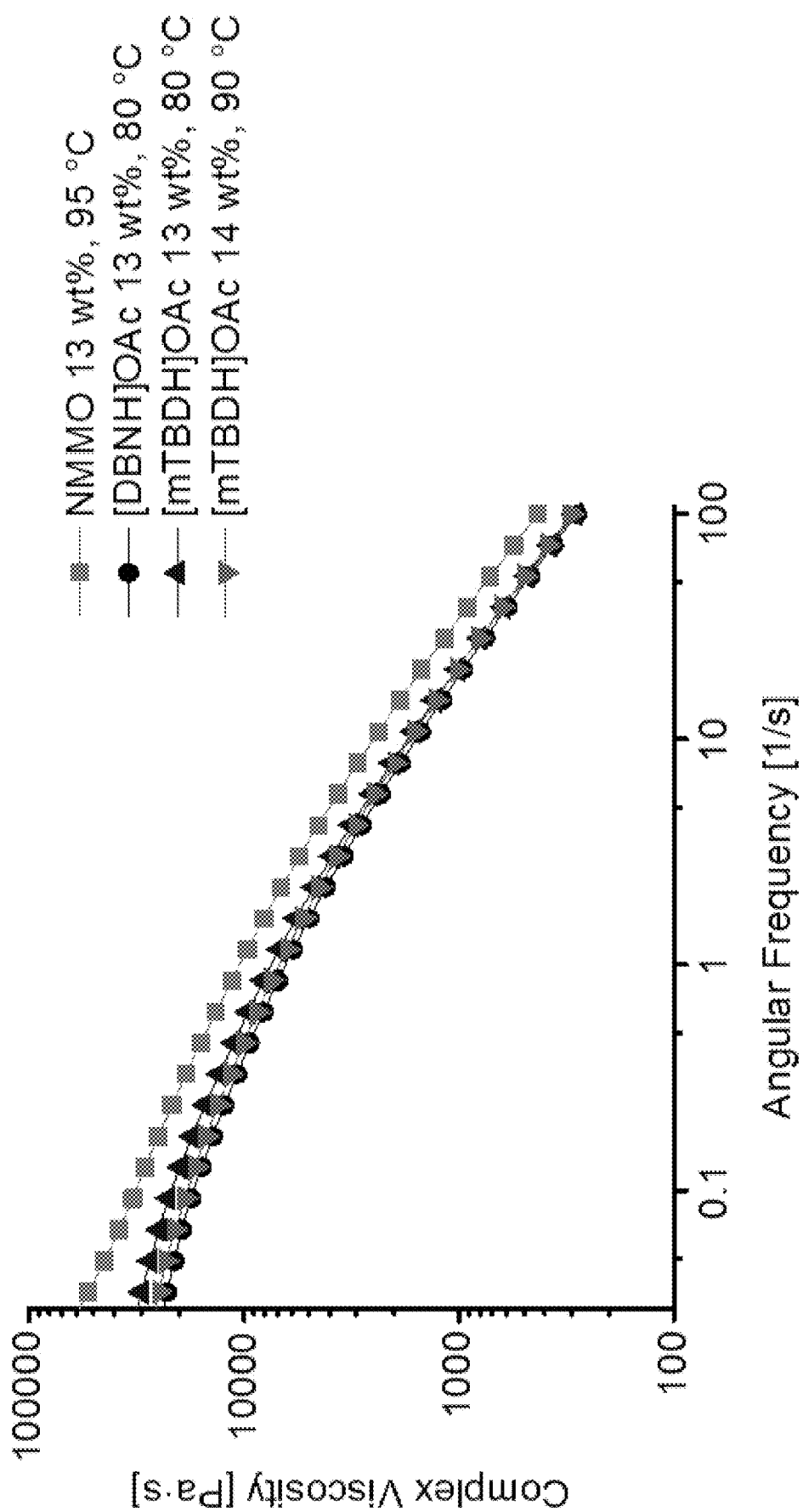
FIGS. 1A-1B show a comparison of complex viscosity (left) and dynamic moduli (right) of NMMO, [DBNH]OAc and [mTBDH]OAc—cellulose solutions.
Figure 1B:
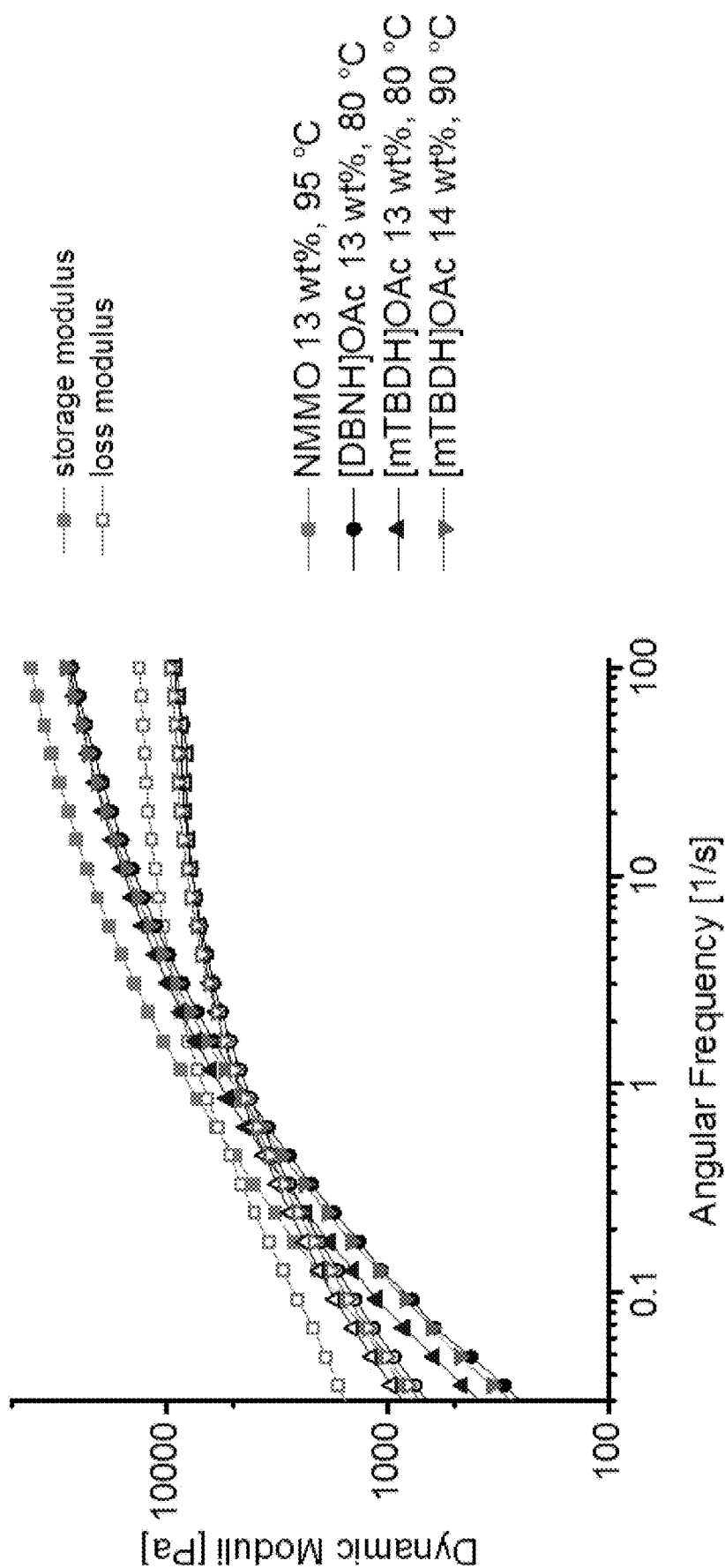

FIGS. 1A-1B show a comparison of complex viscosity (FIG. 1A) and dynamic moduli (storage and loss moduli) (FIG. 1B) of NMMO, [DBNH]OAc and [mTBDH]OAc—cellulose solutions in which each of complex viscosity and dynamic moduli are plotted against angular frequency in accordance with at least some embodiments of the present invention. In FIG. 1 B the solid symbols represent the storage moduli and the open symbols denote the loss moduli. It can be seen from the graphs that solutions of cellulose in (TBD)-ILs, in particular in 7-methyl-1,5,7-triazabicyclo[4.4.0]dec-5-enium acetate showed visco-elastic properties that are similar to respective solutions in NMMO monohydrated and [DBNH] OAc, respectively (see also Table 3). This enables efficient spinning of the respective solutions in a dry-jet wet spinning process. The required spinning temperature is slightly higher than for [DBNH]OAc solutions, but lower than in the NMMO-based Lyocell process. This seems to be a particular feature of DBN- and TBD-based ionic compounds. ILs derived from the structurally analogous 1,1,3,3-tetramethylguanidine (TMG), such as [TMGH] OAc for instance, could not be used as spinning solvent. Respective cellulose solutions depicted a strong gel-character which hampered filament extrusion and impeded their draw in the air gap.

Figure 2:
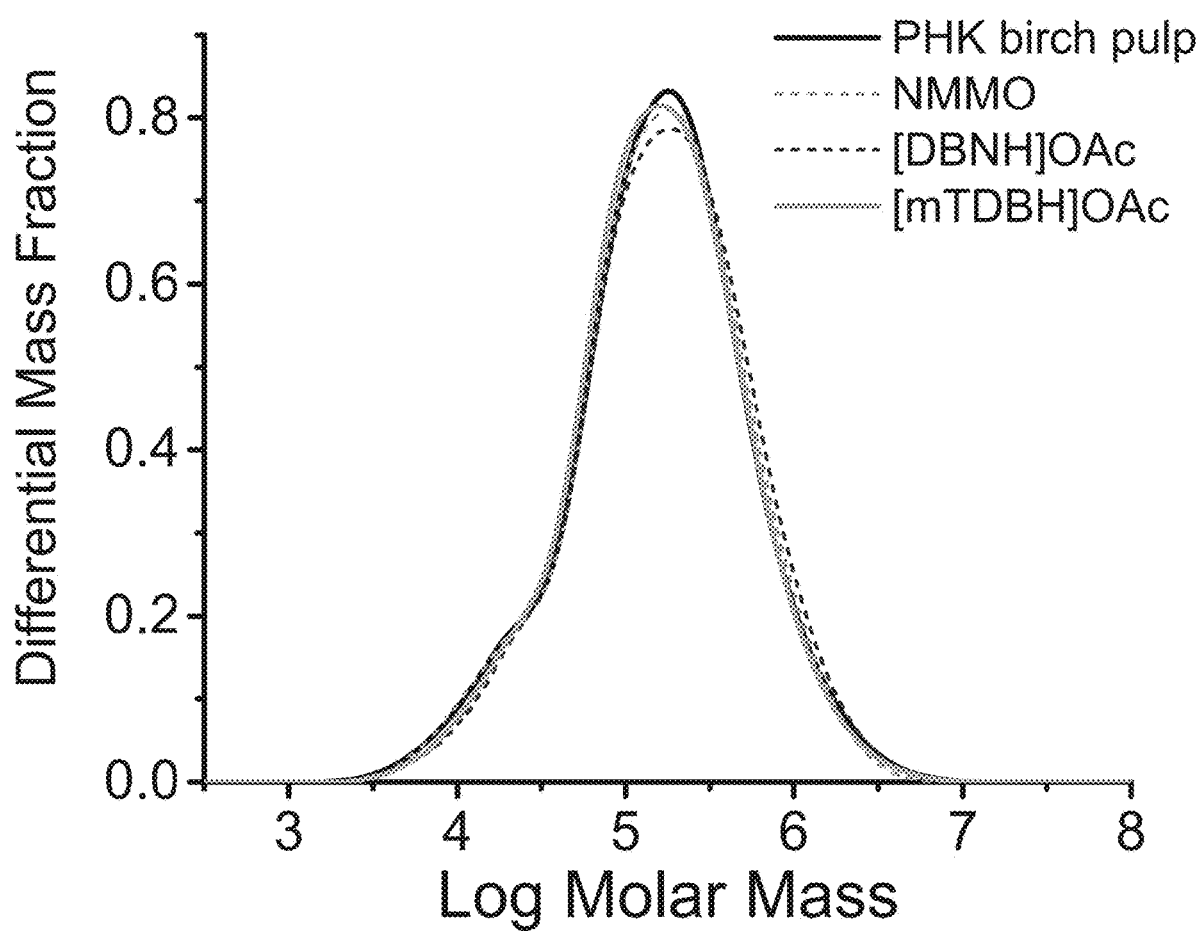
FIG. 2 shows molar mass distribution of original prehydrolysis kraft birch pulp and fibres spun from various solvents.

FIG. 2 is a graph showing a plot of differential mass fraction plotted against log molar mass in which the molar mass distribution of original prehydrolysis kraft birch pulp and fibres spun from various solvents. Comparing PHK birch pulp before dissolution with fibres spun from NMMO, [DBNH]OAc and [mTDBH]OAc it can be seen from the Figure that there is no statistically significant degradation. In other words, the particular favourable visco-elastic properties encountered for TBD-based IL-cellulose solutions allow for mild processing conditions during the unit operations of dissolution, filtration, de-aeration and spinning. This low thermal stress is reflected by an almost complete conservation of the cellulose's molar mass distribution.

Figure 3:
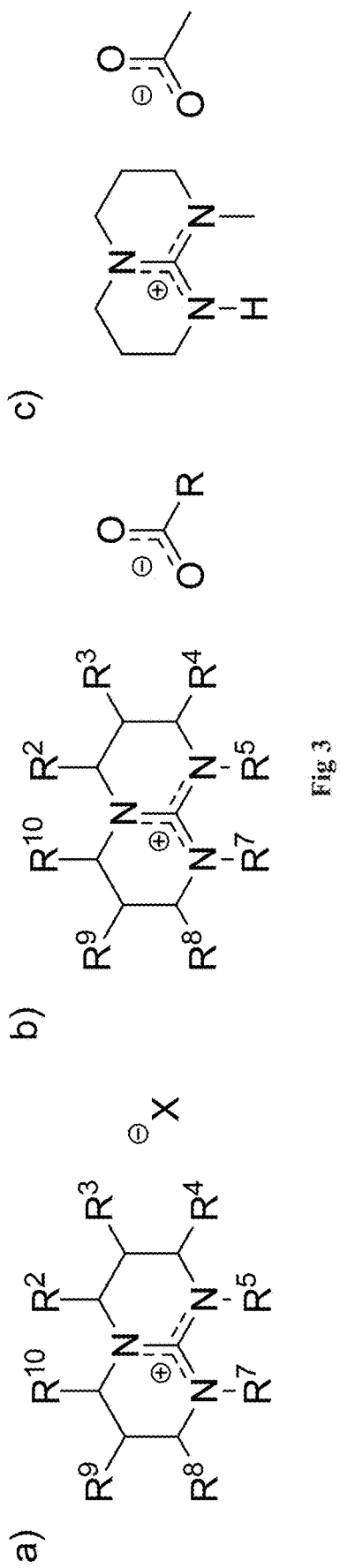
FIG. 3 illustrates example structures of ionic liquids suitable for cellulose dissolution, fibre spinning and having increased hydrolytic stability: R, $R^5$, and $R^7$ are H or organyl radicals. In addition, positions $R^2$, $R^3$, $R^4$, $R^8$, $R^9$ and $R^{10}$ may be substituted by organyl radicals or may be simply hydrogen atoms. Organyl radicals are preferentially alkyl or polyether chains but most preferentially methyl groups. b) Carboxylates have been proven most beneficial. c) 7-methyl-1,5,7-triazabicyclo[4.4.0]dec-5-enium acetate [mTBDH]OAc.

FIG. 3 illustrates example structures of ionic liquids suitable for cellulose dissolution, fibre spinning and having increased hydrolytic stability. The ionic liquids typically comprise a (preferably alkylated) cationic 1,5,7-triazabicyclo[4.4.0]dec-5-enium [TBDH]+ moiety and an anion with high basicity, in terms of proton affinity or Kamlet-Taft parameter. R, $R^5$, and $R^7$ are H or organyl radicals. In addition, positions $R^2$, $R^3$, $R^4$, $R^8$, $R^9$ and $R^{10}$ may be substituted by organyl radicals or may be simply hydrogen atoms. Organyl radicals are preferentially alkyl or polyether chains but most preferentially methyl groups. The preferred anions of the ionic liquids are halides (fluoride, chloride, bromide and iodide), pseudohalides (cyanide, thiocyanide, cyanate), carboxylates (formate, acetate, propionate, butyrate), alkyl sulphite, alkyl sulphate, dialkyl phosphite, dialkyl phosphate, dialkyl phosphonites, dialkyl phosphonates. Carboxylates have been proven most beneficial (FIG.

3b). The optimum scope of the core TBD-based ionic liquid structure is shown in FIG. 3c.

Figure 4:
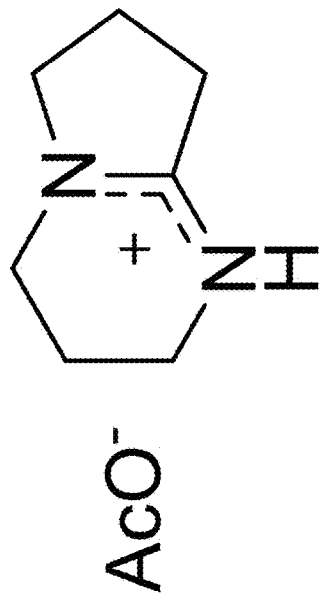
FIG. 4 shows a potential reaction mechanism for the hydrolysis of [DBNH][OAc] to [APPH][OAc].
Figure 4:
Figure 4:
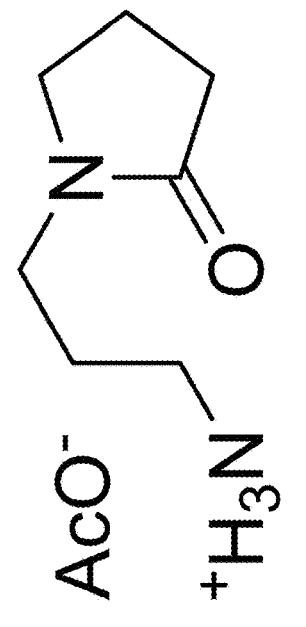

FIG. 4 shows a potential reaction mechanism for the hydrolysis of [DBNH][OAc] to [APPH][OAc]. The hydrolysis kinetics for [DBNH][OAc] were accurately determined via $^1$H-NMR for an ionic liquid water mixture of 1:1 mol ratio. 5% hydrolysis of [DBNH][OAc] to [APPH][OAc] was found within 15 min at 90° C.

Figure 5:
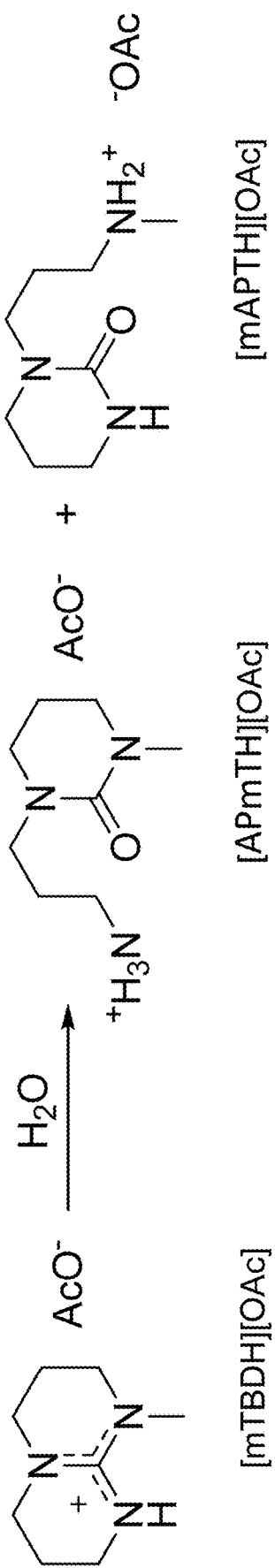
FIG. 5 shows a potential reaction mechanism for the hydrolysis of [mTBDH][OAc] to [APmTH][OAc] and [mAPTH][OAc].

FIG. 5 shows a potential reaction mechanism for the hydrolysis of [mTBDH][OAc] to [APmTH][OAc] and [mAPTH][OAc]. The hydrolysis kinetics for [mTBDH][OAc] were accurately determined via $^1$H-NMR for an ionic liquid water mixture of 1:1 mol ratio. <0.3% hydrolysis of [mTBDH][OAc] to [APmTH][OAc] and [mAPTH][OAc] was found over 15 min at 90° C.

Figure 6:
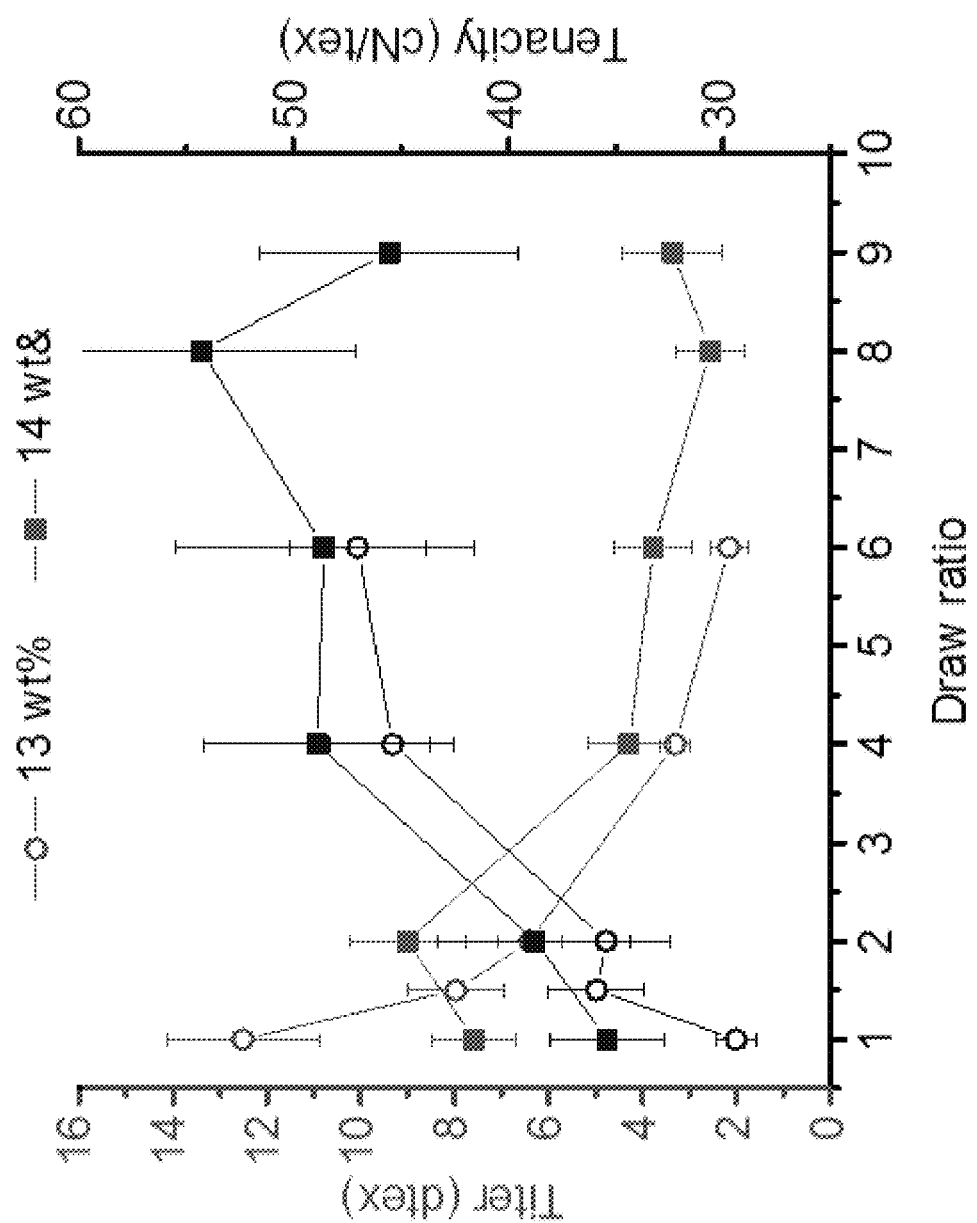
FIG. 6 is a graph showing mechanical properties of [mTBDH]OAc spun fibres as function of draw (conditioned). Fibres spun from 13 wt % solution were measured at Aalto University; fibres spun from 14 wt % solution were measured by an external, accredited institute.

FIG. 6 is a graph showing mechanical properties of [mTBDH]OAc spun fibres as function of draw (conditioned). The mechanical properties measured were Titer (dtex) and Tenacity (cN/tex). Fibres spun from 13 wt % solution were measured at Aalto University; fibres spun from 14 wt % solution were measured by an external, accredited institute.

Figure 7:
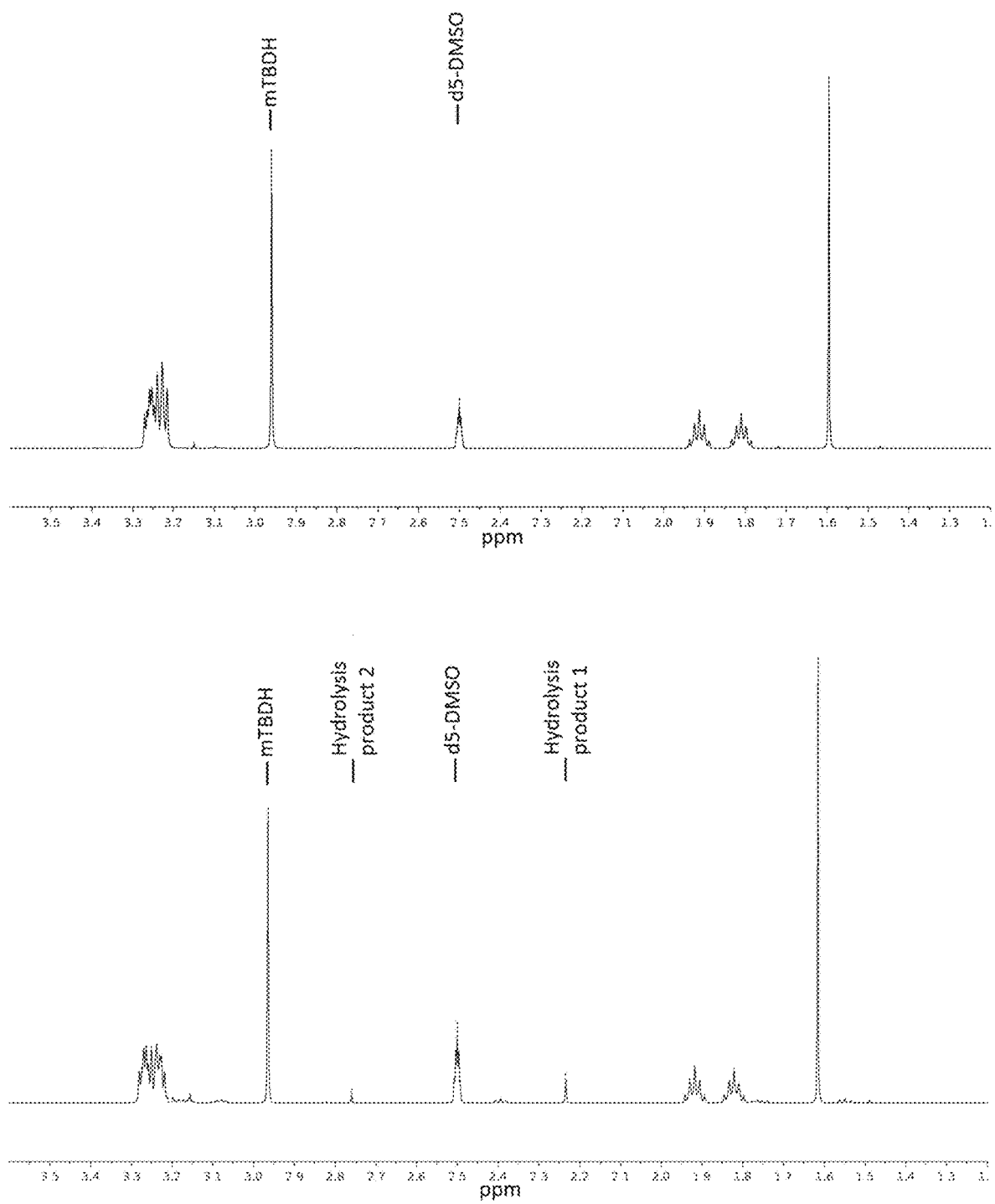
FIG. 7 shows ¹H-NMR spectra of [mTBDH][OAc] (top) and after heating (bottom).
Figure 8A:
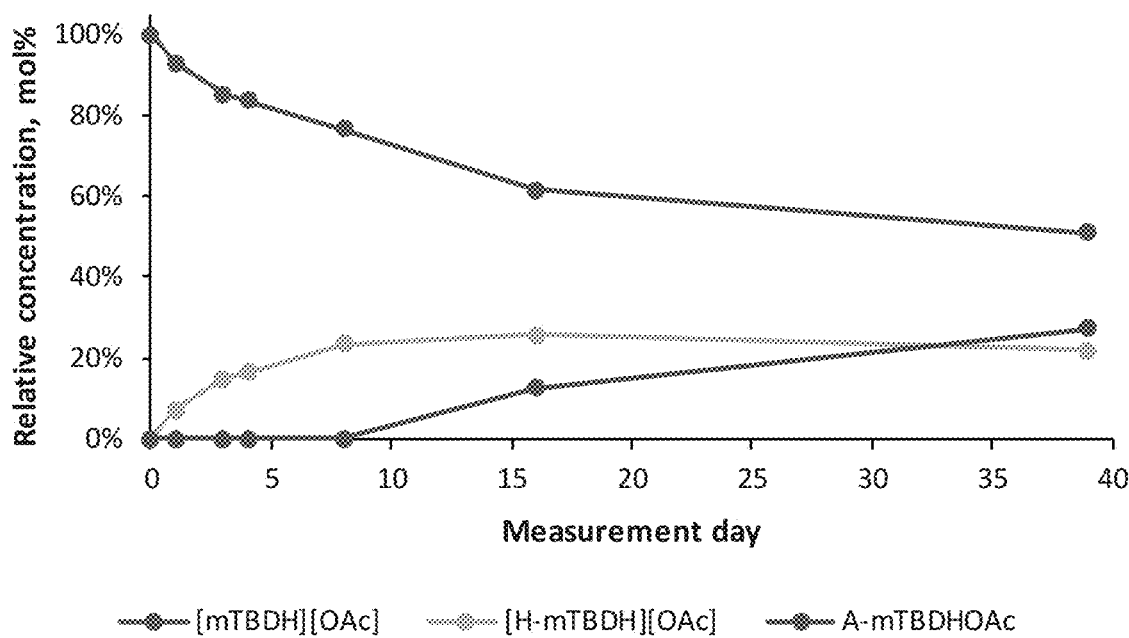
FIGS. 8A-8H provide 8 graphs showing the relative concentrations in mol % of ionic liquids and their hydrolysis products plotted against time in days.
Figure 8B:
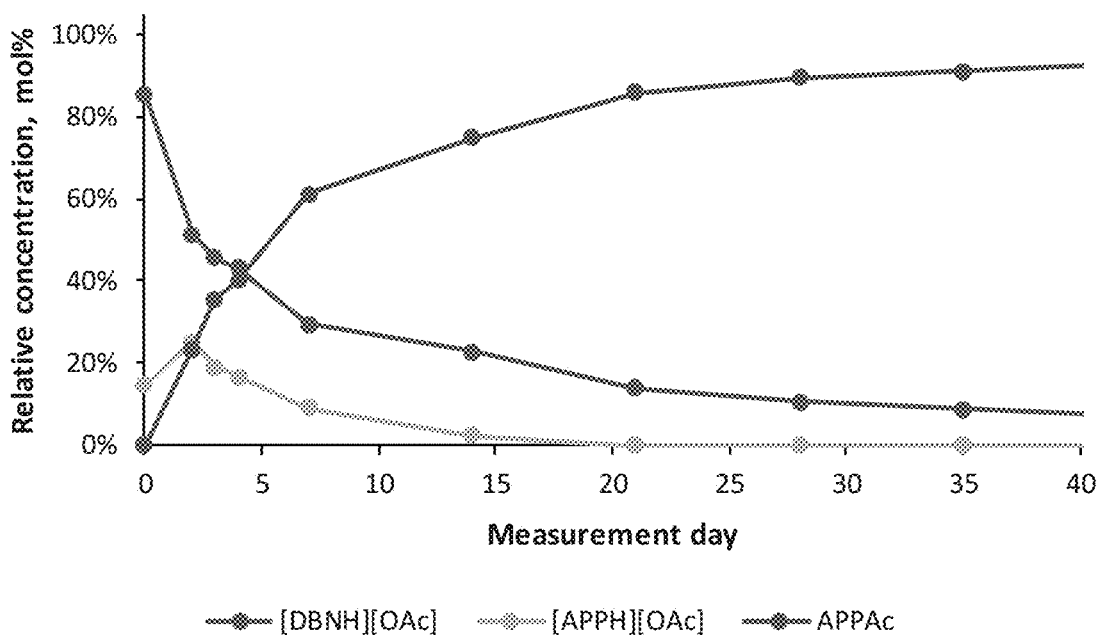
Figure 8C:
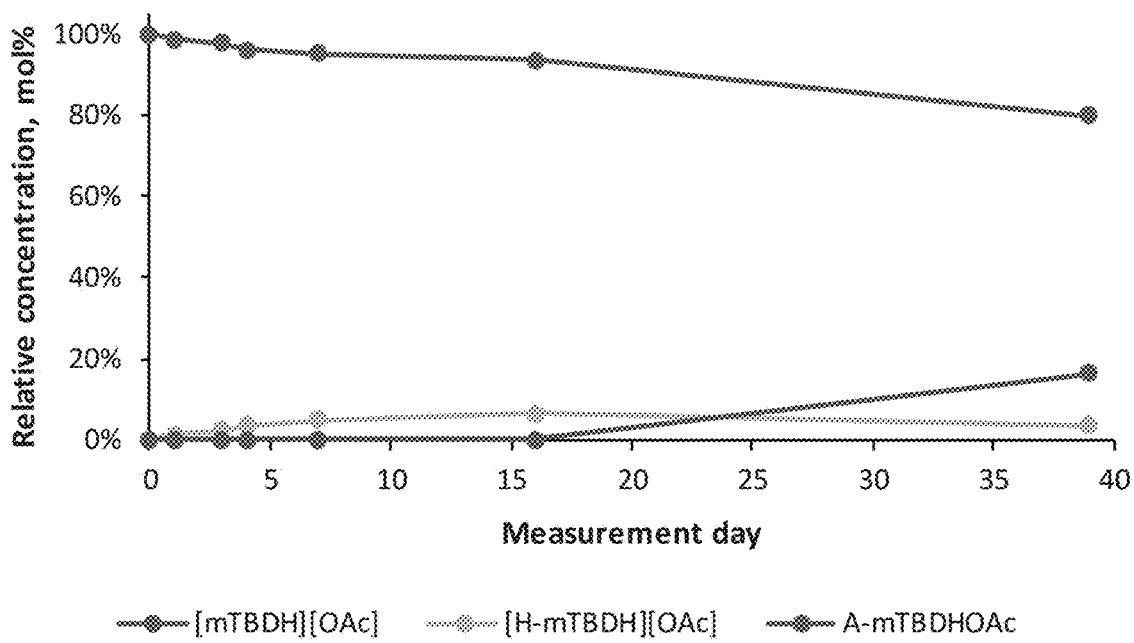
Figure 8D:
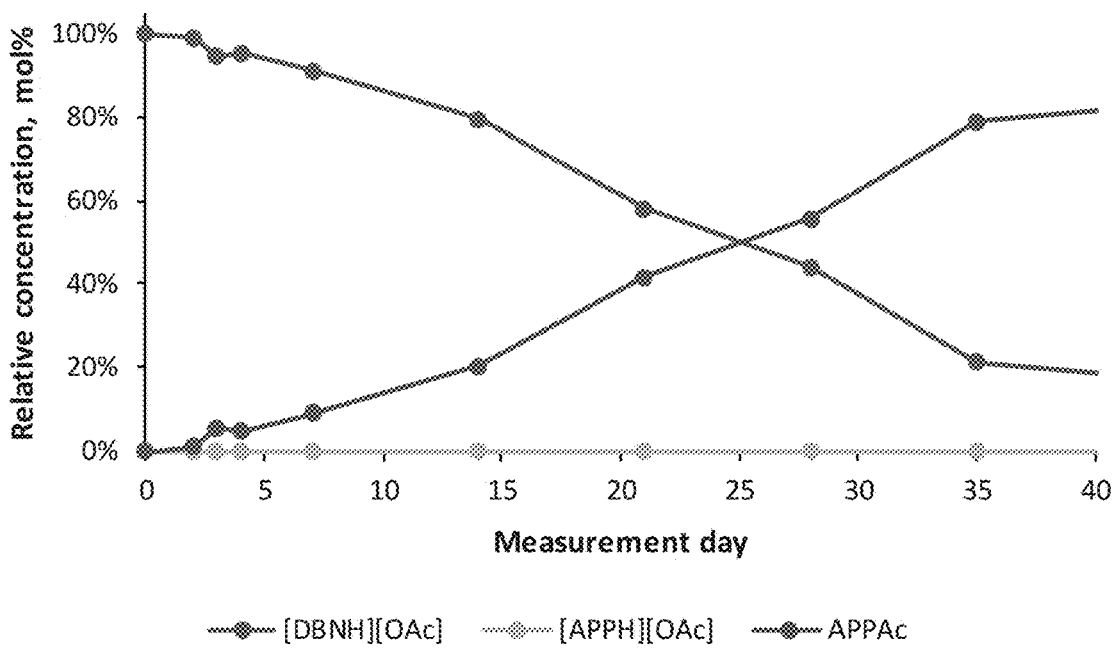
Figure 8E:
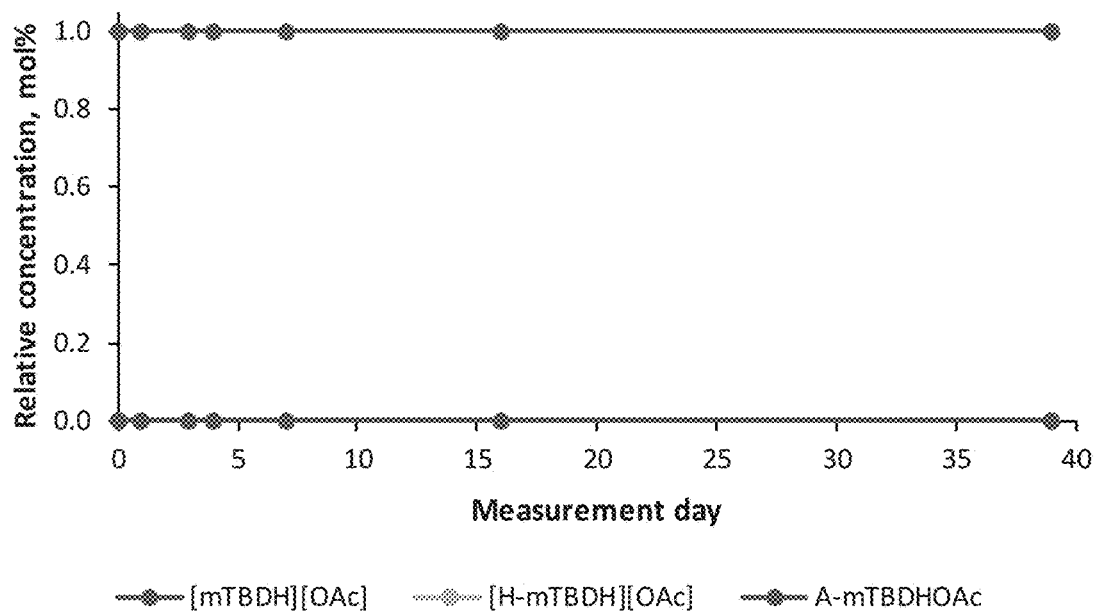
Figure 8F:
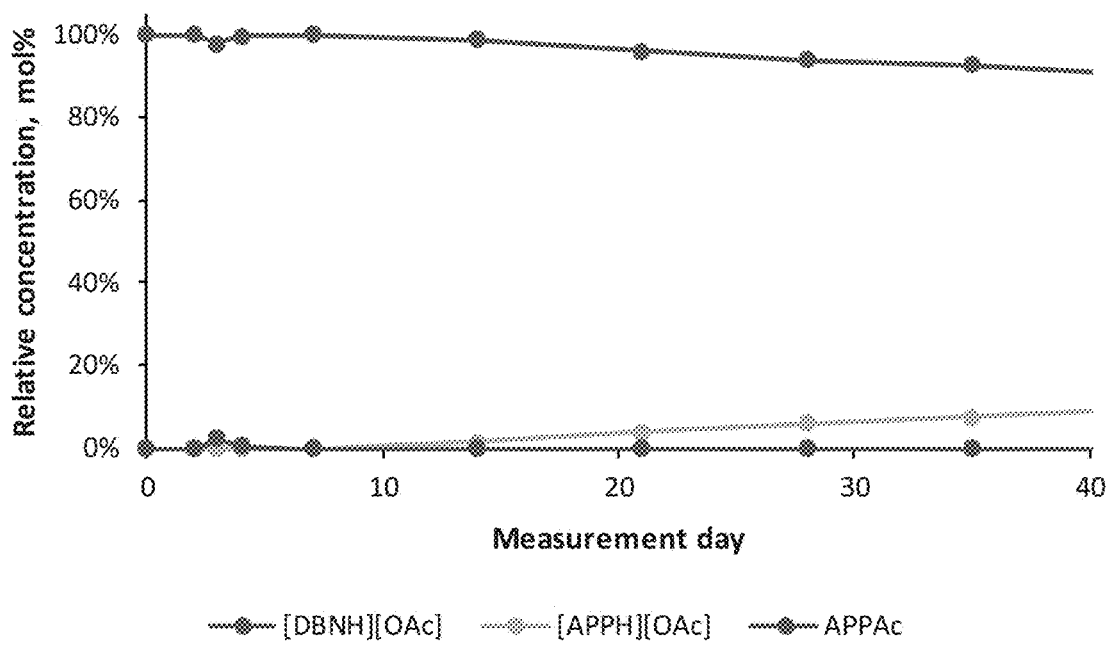
Figure 8G:
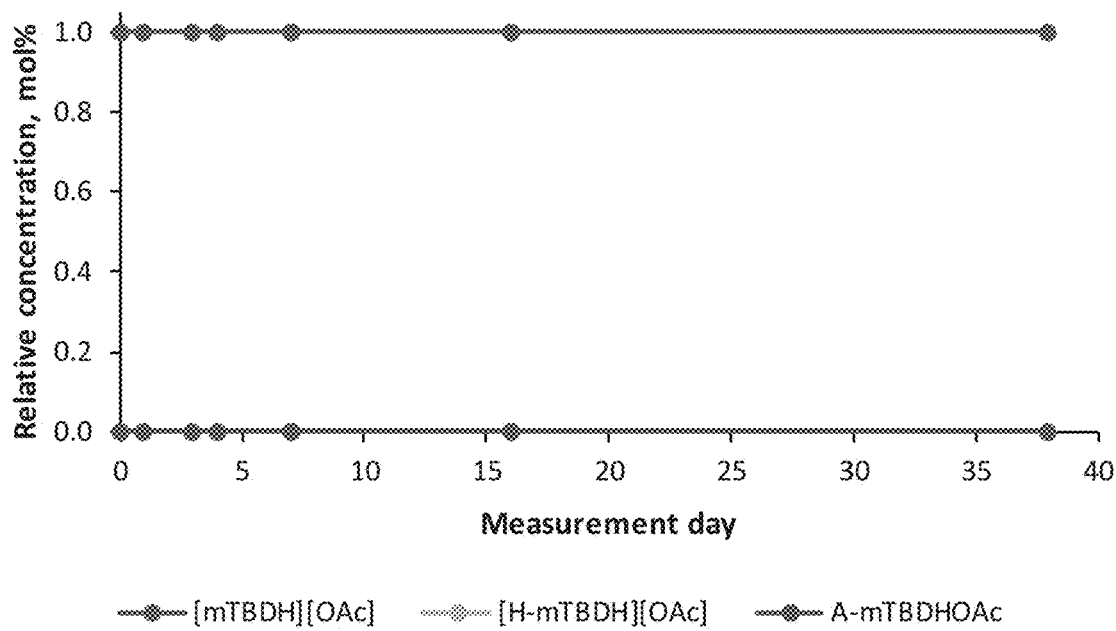
Figure 8H:
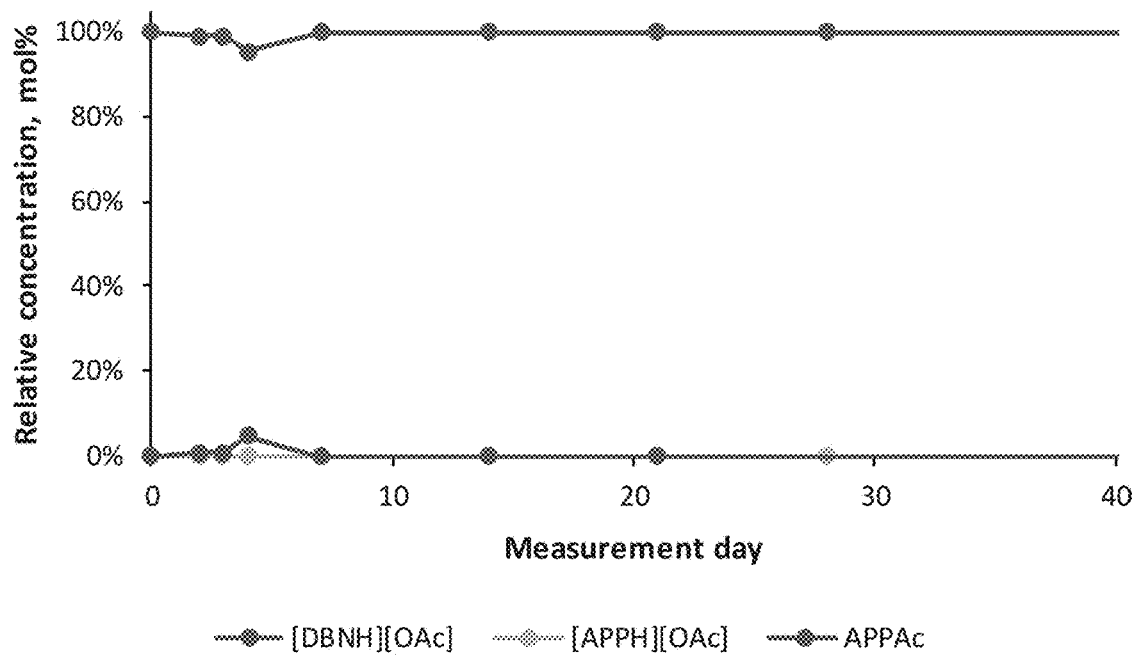

FIG. 7 shows $^1$H-NMR spectra of [mTBDH][OAc] (top) and after heating (bottom), i.e. the- degree of hydrolysis of [mTBDH][OAc] was measured using $^1$H NMR. The ionic liquid-water mixture (1:1 mole ratio) was heated at 90° C. and separately at 130° C. $^1$H NMR analysis, integrating [mTBDH][OAc] against the two hydrolysis products [APmTH][OAc] and [mAPTH][OAc] showed <0.3% degradation over 15 min at 90° C. 11.4% hydrolysis was found to occur over 60 min at the significantly higher temperature of 130° C. (APmT: 1-(3-ammoniopropyl)tetrahydro-3-methyl-2(1H)-pyrimidinone; mAPT: 1-[3-(methylammonio)propyl]tetrahydro-2(1H)-pyrimidinone acetate)

FIGS. 8A-8H provide 8 graphs showing the hydrolysis kinetics of [mTBDH][OAc] (A, C, E, G) in comparison to [DBNH][OAc] (B, D, F, H) at 80° C. (A-D) and at room temperature (E-H) with 5% added water (A-B, E-F) and without added water (C-D, G-H).

Embodiments described herein relate to a process for making a cellulose fibre or film comprising the steps of dissolving pulp in an ionic liquid containing a cationic 1,5,7-triazabicyclo[4.4.0]dec-5-enium [TBDH]+ moiety and an anion selected from the group according to Formula a), Formula b) and Formula c), a)

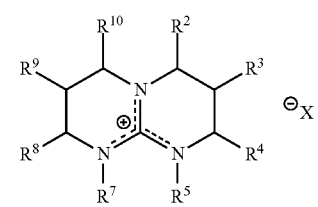

b)

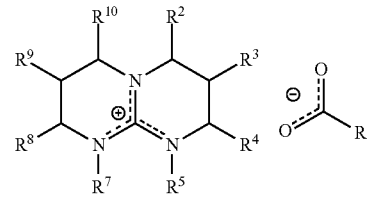

c)

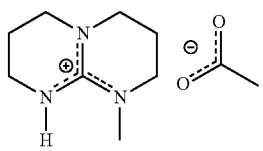

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates, to provide a spinning dope, extruding the spinning dope through a spinneret to form one or more filaments, and a step selected from the group consisting of spinning cellulose fibres from the solution and extruding a cellulose film from the solution.

As described above, the ionic liquids employed in present embodiments have excellent hydrolytic stability when compared to other ionic liquids, e.g. when compared to [DBNH][OAc].

In one embodiment the organyl radicals of the cationic moiety are alkyl groups. In a further embodiment the organyl radicals are polyether chains. In an embodiment, the organyl radicals are linear or branched alkyl (typically C1-C6), alkoxy or alkoxyalkyl groups or residues containing aryl moieties. In a preferred embodiment the organyl radicals are methyl groups.

Further embodiments describe anions of the ionic liquid. In one embodiment the anion is a halide, preferably a halide selected from the group consisting of fluoride, chloride, bromide and iodide. In a suitable embodiment the anion is a carboxylate, preferably a carboxylate selected from the group consisting of formate, acetate, propionate and butyrate. Carboxylates have proven to be the most beneficial anions in embodiments of the present invention. Carboxylates and in particular acetates form the best compromise with regard to the viscosity, the dissolution power in terms of the beta value (Kamlet-Taft) and the non-corrosivity. Other anions, however are extremely useful in further embodiments. In one embodiment the anion is a pseudohalide, preferably a pseudohalide selected from the group consisting of cyanide, thiocyanide and cyanate.

Various pulps can be dissolved in the dissolving step. In one embodiment the pulp for dissolving is chemical pulp such as paper and dissolving pulp, preferably unbleached chemical pulp, suitably bleached chemical pulp, most suitably bleached dissolving pulp.

Dissolving the pulp can be carried out in a variety of ways. In one embodiment the dissolving step comprises the steps of contacting 5-20 wt % pulp with the ionic liquid to provide a suspension and mixing the suspension in a mixer to dissolve the pulp. Any mixer suitable for the mixing of ionic liquids and pulp may be used. In an embodiment the mixing is carried out with a vertical kneader system. In one embodiment the mixing is carried out with a filmtruder. In a further embodiment, the mixing is carried out with an extruder.

In embodiments using a mixture of an ionic liquid and an anti-solvent for pre-homogenization and suspension of the solute the anti-solvent is partially removed under reduced pressure during the dissolution. In a further embodiment all of the anti-solvent is removed under reduced pressure during the dissolution.

To facilitate the dissolution of the pulp, the ionic liquid may be heated. In one embodiment the ionic liquid is heated to a temperature in the range of 30° C. to 150° C., preferably 50° C. to 130° C., suitably 80° C., 90° C., 100° C., 110° C. or 120° C.

Embodiments provide spinning dopes for spinning cellulose filaments, fibres and or films. For the purposes of the present invention, a spinning dope is a cellulose solution which can be stretched to fibres, filaments and/or films through a spinneret, due to the specific visco-elastic properties of the cellulose solution.

In one embodiment the dissolving step provides a spinning dope having a zero shear viscosity in the range of 20000 to 60000 Pas. In a further embodiment the dissolving step provides a spinning dope having a cross over point of dynamic moduli being located between 0.2-2 $sec^{-1}$ and 1500-7000 Pa, in particular 2000-7000 Pa. It is clear that embodiments of the process provide solutions with viscoelastic properties that are excellent for dry-jet wet spinning where the filaments have to withstand high draw ratios. The visco-elastic properties allow for a stable spinning process which comprises extrusion through spinnerets.

In a further embodiment the spinning dope is filtered with pressure filtration apparatus equipped with a metal fleece filter prior to extruding the spinning dope through the spinneret. The spinning dope is filtered to remove insoluble solid particles and gel particles. The removal of such particles facilitates spinning and ensures a long working life of the spinning equipment, e.g. the spinneret does not clog if insoluble particles have been filtered out.

Similarly, degassing the spinning dope can facilitate spinning. In an embodiment the spinning dope is degassed in a heated vacuum environment.

After dissolving the pulp, the filtrated and degassed spinning dope is, in an embodiment, transferred to a spinning unit. The spinning dope may be transferred in a hot, plastic state, such as at a temperature greater than room temperature, typically a temperature in the range of 30° C. to 150° C., preferably 50° C. to 130° C., suitably 80° C., 90° C., 100° C., 110° C. or 120° C., most suitably the spinning dope is transferred at a temperature equal or close to the dissolution, filtration or spinning temperature Alternatively, the spinning dope may be stored and later transferred as a solid. In an embodiment the spinning dope is transferred in one or more solid pieces at temperatures below the crystallization point. For the purposes of embodiments described herein, the storage temperature means at a temperature in the range of 17° C. to 50° C., particularly at a temperature in the range of 20° C. to 30° C., suitably at a temperature of 25° C. Solidification of the spin dope at room temperature is a good indicator of suitable visco-elasticity but not a prerequisite.

In a further embodiment, the spinning dope is extruded into an air gap. In an embodiment the filaments provided by extrusion are stretched in the air gap. The stretch can comprise draw ratios from 1 to 20, preferably draw ratios from 6 to 15. This allows shaping the solution as filament or film by stretching the filament or film while still in solution to orient the molecules.

Extrusion takes place at an elevated temperature. In one embodiment the spinning dope is extruded at a temperature in the range of 60° C. to 100° C., preferably 75° C. to 95° C., suitably 80° C. to 90° C.

Different spinnerets may be used in embodiments. In one embodiment the spinning dope is extruded through a multifilament spinneret.

In a further embodiment the filament is drawn through a spin bath for regenerating cellulose, said spin bath containing an antisolvent, or a mixture of the antisolvent and the ionic liquid used as spinning solvent. In one embodiment the antisolvent is water.

Fibres spun from hydrothermally stable ionic liquids have excellent properties. From the following table it can be seen that the properties of fibres spun from a cellulose solution in [mTBDH]OAc, compare exceedingly favourably with commercial textile fibres, viscose, modal and lyocell, as well as fibres spun from NMMO and [DBNH]OAc.

TABLE 2

Properties of commercial textile fibres and fibres spun from NMMO, [DBNH]OAc and [mTBDH]OAc solutions.

|  | commercial | | | laboratory | | | |
| --- | --- | --- | --- | --- | --- | --- | --- |
|  | Viscose | Modal | Lyocell | NMMO 13%[a] | [DBNH]OAc 13%[a] | [mTBDH]OAc 13% | [mTBDH]OAc 13%[c] |
| Titre [dtex] | 1.4 | 1.3 | 1.3 | 1.5[b] | 1.5[b] | 1.24 | 1.21 |
| Tenacity cond. [cN/dtex] | 23.9 | 33.1 | 40.2 | 54.7[b] | 54.9[b] | 49.9 | 52.8 |
| Elongation cond. [%] | 20.1 | 13.5 | 13.0 | 11.2[b] | 10.7[b] | 9.5 | 10.0 |
| Tenacity wet [cN/dtex] | 12.5 | 18.4 | 37.5 |  |  | 49.4 | 51 |
| Elongation wet [%] | 22.0 | 14.1 | 18.4 |  |  | 11.8 | 12.1 |

[a] draw ratio: 14;
[b] measured by an external, accredited institute;
[c] spun using recycled [mTBDH][OAc].

Thus, embodiments relate to the production of fibres and films. In one embodiment the process produces a cellulose fibre having a dry tenacity of >35 cN/tex and a wet-to-dry tenacity of >0.70, preferably a dry tenacity of ≥40 cN/tex and a wet-to-dry tenacity of >0.80. In a further embodiment the process produces textile fibres. In a still further embodiment the process produces technical fibres. In one embodiment the process produces a film.

Further embodiments relate to treatment of the ionic liquid solvent. In an embodiment the ionic liquid is recycled. In one embodiment the recycling of the ionic liquid is facilitated through the enhanced hydrothermal stability of the TBD-derived ionic liquid. In a further embodiment, the ionic liquid is purified by vacuum distillation. In an embodiment the ionic liquid is purified before use in embodiments of the process or after recycling. Typically the ionic liquid is recycled for use in embodiments of the present process, for dissolving pulp to make a cellulose fibre or film. Thus, embodiments relate to the use of a recycled ionic liquid for the preparation of a cellulose fibre or film. In an embodiment a recycled ionic liquid containing a cationic 1,5,7-triazabicyclo[4.4.0]dec-5-enium [TBDH]+ moiety and an anion selected from the group according to Formula a), Formula b) and Formula c), a)

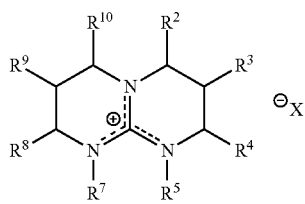

b)

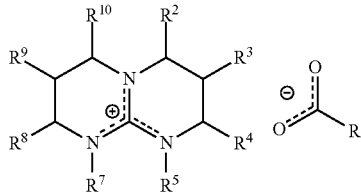

c)

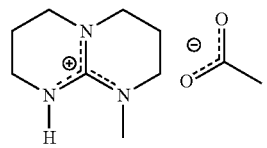

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates is contacted with a pulp to dissolve the pulp providing a spinning dope, extruding the spinning dope through a spinneret to form one or more filaments, and a step selected from the group consisting of spinning cellulose fibres from the solution, and extruding a cellulose film from the solution.

EXAMPLES

Example 1. Preparation of [mTBDH][OAc]

400 g of pre-distilled MTBD was added to 157 g of glacial acetic acid in an Erlenmeyer flask over the period of 10 min. The flask was immersed in an ice bath to avoid the temperature rising above 80° C. After the addition the mixture was shaken thoroughly to give 557 g of [mTBDH][OAc].

Example 2. [DBNH][OAc] Hydrolysis Kinetics

The hydrolysis kinetics for [DBNH][OAc] have been accurately determined via $^1$H NMR for an ionic liquid-water mixture of 1:1 mol ratio. 5% hydrolysis of [DBNH][OAc] to [APPH][OAc] was found within 15 min at 90° C.

Example 3. [mTBDH][OAc] Hydrolysis Kinetics
Experimental

The degree of hydrolysis of [mTBDH][OAc] was measured using $^1$H NMR. The ionic liquid-water mixture (1:1 mole ratio) was heated at 90° C. and separately at 130° C. 1H NMR analysis, integrating [mTBDH][OAc] against the two hydrolysis products [APmTH][OAc] and [mAPTH][OAc] (FIG. 5 and FIG. 7) showed <0.3% degradation over 15 min at 90° C. 11.4% hydrolysis was found to occur over 60 min at the significantly higher temperature of 130° C.

(APmT: 1-(3-ammoniopropyl)tetrahydro-3-methyl-2 (1H)-pyrimidinone; mAPT: 1-[3-(methylammonio)propyl]tetrahydro-2(1H)-pyrimidinone acetate)

Example 4. Preparation of Spinning Dope 5-20 wt-% pulp (preferentially 10-15 wt-%) are mixed in a mixture of a TBD based ionic liquid. The suspension is transferred to a vertical kneader system (or a stirrer at smaller scale). Dissolution proceeds fast (within time periods of 0.5-3 h) at low revolution (10 rpm) and moderate temperature (60° C.-100° C.). The resulting solution can be filtrated by means of a pressure filtration equipped with a metal fleece filter (fineness 5 μm absolute) and degassed in a heated vacuum environment. The spinning dope is then either transformed in hot, plastic state or as solid piece(s) at room temperature to the spinning unit. The spinning conditions are summarized in Examples 5 and 6.

Example 5: Spinning of TBD-Based Dopes

Spinning dope (13 wt-% pre-hydrolysis birch kraft pulp in [[mTBDH]OAc) prepared as described in Example 4 is spun through a multi-filament spinneret (36 holes, 100 μm capillary diameter) at 84° C. with an extrusion velocity of 1.6 ml/min. The take-up velocity was varied systematically to set different draw-ratios. The properties of the resulting fibres are given in Table 4 and FIG. 6. The filaments depicted excellent spinning stability over the whole range investigated.

Example 6: Spinning of TBD-Based Dopes

Spinning dope (14 wt-% pre-hydrolysis birch kraft pulp in [mTBDH]OAc) prepared as described in Example 4 is spun through a multi-filament spinneret (36 holes, 100 μm capillary diameter) at 93° C. with an extrusion velocity of 1.6 ml/min. The take-up velocity was varied systematically to set different draw-ratios. Further parameter and the properties of the resulting fibres are given in Table 5 and FIG. 6. The filaments depicted excellent spinning stability over the whole range investigated.

TABLE 3

Key rheological properties of different spin dopes at the respective spinning temperature

| Solvent | Concentration wt-% | Temperature ° C. | $\eta_0$ Pa·s | $G_{COP}$ Pa | $\omega_{COP}$ s$^{-1}$ |
|---|---|---|---|---|---|
| [mTBDH]OAc | 14 | 90 | 33600 | 4220 | 0.76 |
| [mTBDH]OAc | 13 | 85 | 24300 | 3630 | 0.67 |
| [DBNH]OAc | 13 | 80 | 31700 | 4040 | 0.78 |
| NMMO·H$_2$O | 13 | 95 | 276500 | 5620 | 0.56 |

TABLE 4

Mechanical properties (conditioned with exception of last line) of fibres from 13 wt % [mTBD]OAc solution.

| Draw | Titer dtex | ± | Elongation % | ± | Tenacity cN/tex | ± |
|---|---|---|---|---|---|---|
| 1 | 12.5 | 1.6 | 15.7 | 1.9 | 29.4 | 1.0 |
| 1.5 | 8.0 | 1.0 | 14.8 | 2.1 | 35.9 | 2.3 |
| 2 | 6.4 | 0.7 | 11.3 | 1.7 | 35.5 | 3.0 |
| 4 | 3.3 | 0.3 | 9.9 | 0.7 | 45.4 | 2.9 |
| 6 | 2.2 | 0.4 | 8.9 | 0.6 | 47.0 | 3.2 |
| 6 wet | 2.1 | 0.5 | 10.5 | 1.1 | 44.8 | 3.4 |

TABLE 5

Mechanical properties of fibres from 14 wt % [mTBD]OAc solution (measured by an external, accredited institute).

| Draw | Titer dtex | ± | Elongation % | ± | Tenacity cN/tex | ± |
|---|---|---|---|---|---|---|
| 1 | 7.6 | 0.9 | 14.3 | 2.3 | 35.4 | 2.7 |
| 2 | 9.0 | 1.2 | 14.2 | 2.4 | 38.8 | 4.5 |
| 4 | 4.3 | 0.9 | 11.0 | 1.7 | 48.9 | 5.3 |
| 6 | 3.8 | 0.8 | 9.5 | 1.5 | 48.6 | 7.0 |
| 8 | 2.6 | 0.7 | 9.2 | 1.0 | 54.3 | 7.2 |
| 9 | 3.4 | 1.1 | 9.2 | 1.2 | 45.6 | 6.0 |

Example 7: Hydrolytic Stability of [mTBDH][OAc] in Comparison to [DBNH][OAc]

Hydrolysis kinetics for [mTBDH][OAc] and [DBNH][OAc] were measured using moisture contents ranging form 0 to 5 wt-%, representing a relevant range for the process of dissolution and spinning. Room temperature is relevant for the transportation and long-term storage of the ionic liquid, whereas 80° C. represents the operation temperature in the dissolution and spinning process. The concentrations of ionic liquids and their hydrolysis products were determined by means of capillary electrophoresis (CE). The results are shown in FIG. 8.

For neat [mTBDH][OAc], no hydrolysis was observed at room temperature during the period of 38 days. The same applies for neat [DBNH][OAc] for the same storage time; however, after 80 days the formation of 5 mol-% of APPAc was observed.

At 80° C., the [mTBDH][OAc] sample without added moisture showed hydrolysis of 6 mol-% during 16 days and 20 mol-% during 39 days. For the first 16 days, the hydrolysis was due to the formation of [H-mTBDH][OAc], whereas also [A-mTBDH][OAc] was observed after 39 days. For neat [DBNH][OAc], more than 20 mol-% was converted to APPAc in 16 days, and approximately 80 mol-% in 39 days. After 80 days, only 8 mol-% of the original [DBNH][OAc] was remaining in the sample, the rest being hydrolyzed to APPAc.

The [mTBDH][OAc] sample with 5 wt-% added water was also completely stable towards hydrolysis at room temperature during the studied period of 39 days. In comparison, 8 mol-% of [DBNH][OAc] with 5% moisture was hydrolysed towards [APPH][OAc] in 35 days and 10 mol-% in 80 days.

At 80° C., 38 mol-% of the [mTBDH][OAc] with 5 wt % added water was hydrolyzed after 16 days, and 49 mol-% after 39 days. In the end of the period of 39 days, 22 mol-% of [H-mTBDH][OAc] was observed, whereas the share of the acetylated form was 27 mol-%. For comparison, more than 90% of [DBNH][OAc] was hydrolysed in the same time, converting completely to its amide form. After 80 days, only 5 mol-% of the original [DBNH][OAc] remained.

[mTDBH][OAc] outperformed [DBNH][OAc] based on the following findings:

[mTBDH][OAc] showed complete hydrolytic stability at room temperature for a period of 39 days, even in the presence of 5 wt % added moisture.

Neat [mTBDH][OAc] was found 4 times more stable towards hydrolysis at 80° C. than neat [DBNH][OAc] (20 mol-% vs. 80 mol-% hydrolyzed in 39 days) and the hydrolysis was 64% slower (hydrolysis of 20 mol-% in 39 days vs. in 14 days)

In the presence of 5 wt-% added moisture, [mTBDH][OAc] was 5 times more stable towards hydrolysis than [DBNH][OAc] (51 mol-% of IL remaining intact after 39 days for [mTBDH][OAc] vs. 10 mol-% for [DBNH][OAc]). The hydrolysis was 19 times slower (50 mol-% hydrolyzed in >39 days for [mTBDH][OAc] vs. <2 days for [DBNH][OAc]).

Example 8: Recyclability of [mTBDH][OAc]

Spinning dope (13 wt-% pre-hydrolysis birch kraft pulp in [mTBDH][OAc]) prepared as described in Example 4 is spun through a multi-filament spinneret (200 holes, 100 μm capillary diameter) at 85° C. with an extrusion velocity of 5.5 ml/min. The [mTBDH][OAc] solvent was recovered from the coagulation bath using a multi-step evaporation to remove the water, reaching a residue water content of 2 to 3.5 wt-%. The recovered solvent was characterized based on capillary electrophoresis (CE), Karl-Fischer titration and $^1$H NMR, and used for preparing a spinning dope of the next cycle without further purification.

In total, five consecutive spinning cycles were run. No hydrolysis products were detected in the recovered solvent in any of the five runs. The spinning performance of the dopes prepared with the recovered solvent were comparable with those made using the fresh solvent. The key rheological properties of the spinning dopes are listed in Table 6.

mol-% of [APPH][OAc]. The recovered solvent (with residual water content of 2.9 to 3.5 wt-%) was not capable of dissolving cellulose to prepare a spinning dope and thus could not be recycled even once.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numer-

TABLE 6

The key rheological properties of the spinning dopes prepared using recovered [mTBDH][OAc].

| Cycle | Solvent | Moisture content in the solvent wt-% | Concentration wt-% | Temperature ° C. | $\eta_0$ Pa · s | $G_{COP}$ Pa | $\omega_{COP}$ s$^{-1}$ |
|---|---|---|---|---|---|---|---|
| 1 | Fresh [mTBDH]OAc | 0.24 | 13 | 85 | 32700 | 2337 | 0.29 |
| 2 | [mTBDH]OAc recovered from cycle 1 | 3.10 | 13 | 85 | 28500 | 3996 | 0.84 |
| 3 | [mTBDH]OAc recovered from cycle 2 | 2.17 | 13 | 85 | 31200 | 3918 | 0.74 |
| 4 | [mTBDH]OAc recovered from cycle 3 | 2.65 | 13 | 85 | 26835 | 3630 | 0.81 |
| 5 | [mTBDH]OAc recovered from cycle 4 | 2.84 | 13 | 85 | 32890 | 4203 | 0.76 |

In comparison, when [DBNH][OAc] used for fiber spinning was recovered, the recovered solvent contained 10.3 to 11.9 ous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the preparation of shaped cellulose articles formed from cellulose films, fibres and filaments. The articles may be woven or non-woven, melted, vacuum-formed or moulded in any other way suitable for forming articles from spun cellulose.

CITATION LIST

1. CAC, CIRFS, Fibre Economic Bureau, National Statistics, The Fibre Year 2015
2. Bywater, N. (2011) The global viscose fibre industry in the 21st century—the first 10 years. Lenzinger Ber. 89:22-29.
3. Röder, T., Moosbauer, J., Kliba, G., Schlader, S., Zuckerstätter, G., Sixta, H. (2009) Comparative cha-racterisation of man-made regenerated cellulose fibres. Lenzinger Ber. 87:98-105.
4. a) Buijtenhuijs, F. A., Abbas, M., Witteveen, A. J. (1986) The degradation and stabilization of cellulose dissolved in N-methylmorpholine N-oxide (NMMO). Papier (Darmstadt) 40:615-619. b) Rosenau, Thom-as; Potthast, Antje; Sixta, Herbert; Kosma, Paul (2001) The chemistry of side reactions and byproduct formation in the system NMMO/cellulose (Lyocell process). Progress in Polymer Science 26(9): 1763-1837.
5. Swatloski, R. P., Spear, S. K., Holbrey, J. D., Rogers, R. D. (2002) Dissolution of Cellose with Ionic Liquids. J. Am. Chem. Soc. 124:4974-4975.
6. Hummel, M.; Michud, A.; Tanttu, M.; Asaadi, S.; Ma, Y.; Hauru, L. J.; Parviainen, A.; King, A. T.; Kipelainen, I.; Sixta, H., Ionic Liquids for the Production of Man-Made Cellulosic Fibres: Opportunities and Challenges. Adv. Polym. Sci. 2016, 271, 133-168.
7. Buijtenhuijs, F. A.; Abbas, M.; Witteveen, A. J., The degradation and stabilization of cellulose dissolved in N-methylmorpholine N-oxide (NMMO). Papier 1986, 40, 615-19.
8. Rosenau, T.; Potthast, A.; Sixta, H.; Kosma, P., The chemistry of side reactions and byproduct for-mation in the system NMMO/cellulose (Lyocell process). Prog. Polym. Sci. 2001, 26 (9), 1763-1837.

The invention claimed is:
1. A process for making cellulose filaments, fibres, and/or a film comprising the steps of:
dissolving pulp in an ionic liquid containing a cationic 1,5,7-triazabicyclo[4.4.0]dec-5-enium [TBDH]+ moiety and an anion selected from the group consisting of Formula a), Formula b), and Formula c), a)
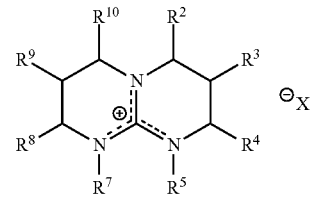

b)
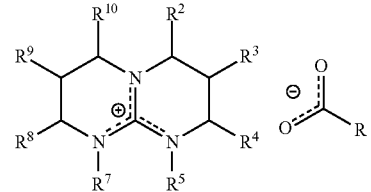

c)
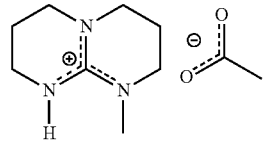

wherein each of R, $R^2$, $R^3$, $R^4$, $R^5$, $R^7$, $R^8$, $R^9$ and $R^{10}$ is H or an organyl radical and $X^-$ is selected from the group consisting of halides, pseudohalides, carboxylates, alkyl sulphite, alkyl sulphate, dialkylphosphite, dialkyl phosphate, dialkyl phosphonites and dialkyl phosphonates, to provide a spinning dope, extruding the spinning dope through a spinneret to form the cellulose filaments, fibres, and/or film.

2. The process according to claim 1, wherein at least one of R, $R^2$, $R^3$, $R^4$, $R^5$, $R^7$, $R^8$, $R^9$ and $R^{10}$ comprises an organyl radical, and wherein the organyl radical comprises an alkyl group.

3. The process according to claim 1, wherein at least one of R, $R^2$, $R^3$, $R^4$, $R^5$, $R^7$, $R^8$, $R^9$ and $R^{10}$ comprises an organyl radical, and wherein the organyl radical comprises a polyether chain.

4. The process according to claim 1, wherein at least one of R, $R^2$, $R^3$, $R^4$, $R^5$, $R^7$, $R^8$, $R^9$ and $R^{10}$ comprises an organyl radical, and wherein the organyl radical comprises a methyl group.

5. The process according to claim 1, wherein the anion comprises a halide selected from the group consisting of fluoride, chloride, bromide, and iodide.

6. The process according to claim 1, wherein the anion comprises a carboxylate selected from the group consisting of formate, acetate, propionate, and butyrate.

7. The process according to claim 1, wherein the anion comprises a pseudohalide selected from the group consisting of cyanide, thiocyanide, and cyanate.

8. The process according to claim 1, wherein the pulp comprises paper or dissolving pulp.

9. The process according to claim 1, wherein the dissolving is done at a temperature in the range of 30° C. to 150° C.

10. The process according to claim 1, wherein the dissolving provides a spinning dope having a zero shear viscosity in a range of 20000 to 60000 Pas.

11. The process according to claim 1, wherein the dissolving provides a spinning dope having a cross over point of dynamic moduli being located between 0.2-2 sec$^{-1}$ and 1500-7000 Pa.

12. The process according to claim 1, wherein the spinning dope is extruded into an air gap during the extruding.

13. The process according to claim 1, wherein the extruding is done at a temperature in a range of 60° C. to 100° C.

14. The process according to claim 1, further comprising drawing the filament through a spin bath for regenerating cellulose, said spin bath containing an antisolvent or a mixture of the antisolvent and the ionic liquid.

15. The process according to claim 14, wherein the antisolvent is water.

16. The process according to claim 1, wherein the extruding forms a cellulose fibre having a dry tenacity of >35 cN/tex and a wet-to-dry tenacity of >0.70.

17. The process according to claim 1, further comprising recycling the ionic liquid after the extruding.

18. The process of claim 1, wherein the forming comprises a step selected from the group consisting of:
   spinning cellulose fibres from the one or more filaments, and
   extruding a cellulose film from the one or more filaments.

* * * * *